US010391744B2

(12) United States Patent
Lambricht et al.

(10) Patent No.: US 10,391,744 B2
(45) Date of Patent: *Aug. 27, 2019

(54) LAMINATED GLAZING FOR SOLAR CONTROL

(71) Applicant: AGC GLASS EUROPE, Louvain-la-Neuve (BE)

(72) Inventors: Thomas Lambricht, Perwez (BE); Jean-Michel Depauw, Brussels (BE); Ingrid Marenne, Forville (BE); Francois Boland, Gemboux (BE); Audrey Dogimont, Sart-Dames-Avelines (BE); Aline Degand, Bleret (BE)

(73) Assignee: AGC GLASS EUROPE, Louvain-la-Nueve (BE)

( * ) Notice: Subject to any disclaimer, the term of this patent is extended or adjusted under 35 U.S.C. 154(b) by 56 days.

This patent is subject to a terminal disclaimer.

(21) Appl. No.: 15/737,563

(22) PCT Filed: Jun. 14, 2016

(86) PCT No.: PCT/EP2016/063634
§ 371 (c)(1),
(2) Date: Dec. 18, 2017

(87) PCT Pub. No.: WO2016/202799
PCT Pub. Date: Dec. 22, 2016

(65) Prior Publication Data
US 2018/0170014 A1    Jun. 21, 2018

(30) Foreign Application Priority Data

Jun. 19, 2015   (EP) .................................. 15172973

(51) Int. Cl.
| | | |
|---|---|---|
| B32B 15/04 | (2006.01) | |
| B32B 17/06 | (2006.01) | |
| B32B 17/10 | (2006.01) | |
| C03C 3/087 | (2006.01) | |
| C03C 4/00 | (2006.01) | |
| C03C 4/02 | (2006.01) | |
| C03C 17/36 | (2006.01) | |
| C03C 3/085 | (2006.01) | |

(52) U.S. Cl.
CPC .... B32B 17/10633 (2013.01); B32B 17/1011 (2013.01); B32B 17/10036 (2013.01); B32B 17/10229 (2013.01); C03C 3/085 (2013.01); C03C 3/087 (2013.01); C03C 4/0092 (2013.01); C03C 4/02 (2013.01); C03C 17/36 (2013.01); C03C 17/366 (2013.01); C03C 17/3618 (2013.01); C03C 17/3626 (2013.01); C03C 17/3639 (2013.01); C03C 17/3642 (2013.01); C03C 17/3644 (2013.01); C03C 17/3652 (2013.01); C03C 17/3681 (2013.01); B32B 2307/412 (2013.01); B32B 2311/08 (2013.01)

(58) Field of Classification Search
USPC .......................... 428/426, 428, 432, 434, 688
See application file for complete search history.

(56) References Cited

U.S. PATENT DOCUMENTS

| | | | | |
|---|---|---|---|---|
| 5,023,210 A  * | 6/1991 | Krumwiede | ............ | C03C 3/087 501/71 |
| 5,728,471 A  * | 3/1998 | Dupont | .................... | C03C 3/078 296/218 |
| 6,998,362 B2 * | 2/2006 | Higby | ........................ | C03C 1/00 501/71 |
| 7,005,182 B1 * | 2/2006 | Hecq | ........................ | C03C 3/087 428/215 |
| 7,169,722 B2 * | 1/2007 | Landa | ..................... | C03C 3/087 501/71 |
| 9,434,635 B2 * | 9/2016 | Horsley | .................. | C03C 3/087 |
| 2004/0110625 A1* | 6/2004 | Smith | .................... | C03B 5/2353 501/72 |
| 2005/0148453 A1* | 7/2005 | Coster | ..................... | C03C 3/095 501/64 |
| 2006/0280951 A1 | 12/2006 | Fleury et al. | | |
| 2007/0161492 A1* | 7/2007 | Smith | ..................... | C03C 1/002 501/64 |
| 2007/0191205 A1* | 8/2007 | Delmotte | ................ | C03C 3/087 501/55 |

(Continued)

FOREIGN PATENT DOCUMENTS

| | | |
|---|---|---|
| DE | 10 2005 016 389 A1 | 10/2006 |
| WO | 2005/115747 A1 | 12/2005 |
| WO | 2015/011044 | 1/2015 |

OTHER PUBLICATIONS

International Search Report dated Sep. 20. 2016, in PCT/EP2016/063634, filed Jun. 14, 2016.

*Primary Examiner* — Lauren R Colgan

(74) *Attorney, Agent, or Firm* — Oblon, McClelland, Maier & Neustadt, L.L.P.

(57) ABSTRACT

The invention relates to laminated glazing comprising a substrate, in particular a transparent substrate, optionally colored, coated with an infrared-reflecting layer and capable of being used as glazing in buildings or in vehicles. The coated substrate is made up of the combination of a glass substrate in which the composition has a redox of less than 15%, characterized by infrared reflection RIRV so that RIRV≥1.087*TLV, wherein TLV is the light transmission of the glass, and an infrared reflecting layer characterized by light transmission TLC so that TLC≥1.3*TIRC, wherein TIRC is the infrared transmission of the layer.

11 Claims, No Drawings

(56) References Cited

U.S. PATENT DOCUMENTS

| | | | |
|---|---|---|---|
| 2007/0213196 A1* | 9/2007 | Jones | C03C 1/00 501/70 |
| 2007/0243993 A1* | 10/2007 | Heithoff | C03C 3/087 501/71 |
| 2008/0149902 A1 | 6/2008 | Teyssedre | |
| 2008/0193686 A1 | 8/2008 | Loergen et al. | |
| 2008/0226925 A1 | 9/2008 | Blacker et al. | |
| 2009/0015909 A1 | 1/2009 | Fleury et al. | |
| 2010/0104840 A1 | 4/2010 | Blacker et al. | |
| 2012/0058879 A1* | 3/2012 | Kim | C03C 4/02 501/64 |
| 2012/0275018 A1 | 11/2012 | Lu et al. | |
| 2012/0315410 A1 | 12/2012 | Heithoff et al. | |
| 2014/0017500 A1* | 1/2014 | Koike | C03C 3/085 428/410 |
| 2014/0249014 A1* | 9/2014 | Lee | C03C 3/087 501/11 |
| 2015/0344354 A1* | 12/2015 | Cho | C03C 4/02 252/587 |
| 2016/0002094 A1* | 1/2016 | Lambricht | C03C 3/087 501/71 |
| 2016/0152511 A1* | 6/2016 | Lambricht | C03C 3/091 359/351 |
| 2018/0194667 A1* | 7/2018 | Lambricht | C03C 3/087 |

* cited by examiner

LAMINATED GLAZING FOR SOLAR CONTROL

The present invention relates to laminated glazings comprising a substrate, in particular a transparent substrate, for example made of glass, or optionally made of colored glass, which are coated with an infrared-reflecting layer.

Such laminated glazings are used for example as glazings of buildings or vehicles, in single or multiple structures.

In the present document, unless otherwise indicated, the following terms are used in accordance with the following definitions:

TL=light transmission=percentage of the incident light flux transmitted by a product (between 380 and 780 nm) with illuminant C and a 2° observer.

$TL_V$=light transmission of the substrate=percentage of the incident light flux transmitted by the glass substrate (between 380 and 780 nm) with illuminant C and a 2° observer. It is here defined for a glass of 4 mm thickness.

$TL_C$=light transmission of the layer=percentage of the incident light flux transmitted by a product consisting of the layer deposited on a substrate having a zero absorption (between 380 and 780 nm) with illuminant C and a 2° observer.

RL=light reflection=percentage of the incident light flux reflected by a product (between 380 and 780 nm) with illuminant C and a 2° observer.

SF=g=solar factor=the percentage of incident energy radiation that is directly transmitted by the product, on the one hand, and absorbed by said product, then radiated by its face opposite to the energy source, on the other hand, calculated according to standard ISO9050:2003.

S=select=selectivity=the ratio of the light transmission to the solar factor.

TIR=infrared transmission=percentage of the infrared radiation transmitted (between 780 and 2500 nm) by a product, calculated according to standard ISO 9050: 2003.

$TIR_C$=infrared transmission of the layer=percentage of the infrared radiation transmitted (between 780 and 2500 nm) by a product consisting of the layer deposited on a substrate having a zero absorption, and calculated according to standard ISO9050: 2003.

RIR=infrared reflection=percentage of the infrared radiation reflected (between 780 and 2500 nm) by a product, calculated according to standard ISO 9050: 2003.

$RIR_V$=infrared reflection of the substrate with an ideal reflector=percentage of the infrared radiation reflected (between 780 nm and 2500 nm) for the glass substrate bearing an ideal layer reflecting 100% in the infrared. It is defined here for a glass substrate of 4 mm thickness, the layer being deposited on the face opposite the incident radiation, and calculated according to standard ISO9050: 2003. The maximum $RIR_V$ value of 100% is reached when there is no absorption in the glass, and $RIR_V$ decreases as the absorption in the glass increases, along the optical path amounting to 2*4 mm (round-trip)=8 mm.

$RIR_C$=infrared reflection of the layer=percentage of the infrared radiation reflected (between 780 and 2500 nm) for a product comprising the layer deposited on a substrate having a zero absorption, calculated according to standard ISO9050: 2003.

AIR: infrared absorption=percentage of the infrared radiation absorbed (between 780 and 2500 nm) by a product, calculated according to standard ISO 9050: 2003.

$AIR_C$=infrared absorption of the layer=percentage of the infrared radiation absorbed (between 780 and 2500 nm) for a product comprising the layer deposited on a substrate having a zero absorption, calculated according to standard ISO9050: 2003.

In certain circumstances, it is desirable for the glazings of buildings or vehicles not to let pass too great a proportion of total incident solar radiation in order not to overheat the interior of the building or passenger compartment while nonetheless offering a suitable light transmission (TL) so as to procure a sufficient light level in the interior of the building or passenger compartment. The transmission of total incident solar radiation may be expressed in terms of solar factor (SF or g). These somewhat conflictual requirements convey the desire to obtain a glazing having a high selectivity (S). It is also desirable for the glazings to meet certain aesthetic criteria in terms of light reflection (RL) and color in reflection.

For a certain amount of time already, to decrease the delivery of solar energy to buildings or vehicles, use has been made of glasses that are colored in their bulk. Colored glazings, in addition to offering various widely appreciated aesthetics, allow the passage of the infrared radiation responsible for interior heating to be decreased (said radiation mainly being absorbed by the glass) while letting pass visible light, and therefore thus exhibit selectivity.

Subsequently, another proposed solution was the use of multilayer solar-control coatings (also sometimes called anti-solar or solar-protection coatings) on substrates made of clear then extra-clear glass. These multilayer solar-control stacks offer a good selectivity as they let visible light pass and reflect the infrared. Examples of known solar-control coatings generally comprise a plurality of layers of an infrared-reflecting metal, such as silver, each thereof being sandwiched between transparent and anti-reflective layers of dielectric material. The selectivity of this type of stack increases as the number of infrared-reflecting layers present in the coating increases, ensuring enhanced reflection of the infrared. However, it still proves to be difficult for these solar-control coatings to ensure not only a high selectivity, but also a pleasant aesthetic appearance, a neutral color in reflection that is angularly stable and a moderate light reflection.

Thus, it would have been thought that combining these two solutions (substrate colored in its bulk and solar-control layer) would lead to a corresponding improvement in the selectivity of a glazing, but the infrared radiation passes two times through the colored glass (a first time from the sun to the interior, and a second time after reflection from the solar-control layer to the exterior), it turns out that the latter absorbs two-times more infrared, some of which it emits towards the interior, and furthermore heats up dangerously to the point sometimes of breaking. One solution is then to temper the glass in order that it resists thermal breakage, but this is a costly and constraining additional step.

There is therefore still a need to provide highly selective laminated glazings, which in particular are colored or of low light transmission, having a low external light reflection (i.e., once mounted, seen from the exterior of the building/vehicle), a lower angular dependency of the color in reflection from the glass side, and that do not need to be tempered to prevent breakage due to thermal heating.

It has been discovered that these combinations of required optical properties may be achieved and other advantages may be obtained, by a laminated glazing according to claim 1 of the present invention, the dependent claims presenting preferred embodiments.

The subject of the present invention is in particular a laminated glazing comprising a transparent substrate coated with an infrared-reflecting layer, characterized in that the substrate is a glass characterized by an infrared reflection $RIR_V$ such that $RIR_V \geq 1.087*TL_V$ and in that the infrared-reflecting layer is characterized by a light transmission $TL_C$ such that $TL_C \geq 1.3*TIR_C$.

Thus the solution provided by the present invention is at the least counter-intuitive, because it demonstrates that it is necessary to associate a selective coating with a glass that, itself, is non-selective, in order to get a glazing the selectivity of which is improved or, at the very least, satisfactory for the desired applications. Specifically, it has been found that, conventionally, for selective glasses, a decrease in light transmission (for aesthetic reasons, for solar-control reasons or for any other reason) is invariably related to a drastic decrease in $RIR_V$. In contrast, the glazings according to the invention allow lower light transmissions to be achieved while preserving a very advantageous infrared reflection. Furthermore, it has been found that all infrared-reflecting layers are not equally suitable for achieving the aims of the invention and that layers that block infrared mainly by reflection, rather than absorption, are necessary.

Thus therefore, the glazings incorporating a substrate according to the invention, combined with an infrared-reflecting coating according to the invention, may provide laminated glazings having one or more of the following advantages:
- a high selectivity even when the glazing comprises a substrate made of glass of low light transmission,
- an improved selectivity with respect to the same glazing incorporating a coating deposited on a glass of the same light transmission of the prior art having an infrared reflection $RIR_V$ such that $RIR_V < 1.087*TL_V$,
- a decrease in the energy transmitted to the interior of the building or vehicle (decrease of the solar factor), and therefore less heating of the latter,
- a limitation of the heating of the glazing (decrease of the absorption), a lower risk of breakage and a decrease in the need for tempering, at equivalent solar factor,
- various aesthetics and colors,
- attenuated external reflection of light, and therefore a less reflective appearance seen from the exterior of the building or vehicle, for a given level of light transmission and/or a given selectivity,
- a possible correction, by virtue of the substrate made of colored glass, of the color in external reflection created by the coating, without impact on properties such as selectivity for example,
- a lesser angular dependency of the color in external reflection, and therefore a more uniform appearance of the color of a curtain wall of a building or of the glazings of a vehicle whatever the location of the glazing within the curtain wall or the angle of installation thereof in the vehicle, without impact on properties such as selectivity.

The benefit of these advantages is even greater for substrates made of thick glass, for which, precedingly, the absorption and the energy reemitted toward the interior of the building or vehicle increased with thickness. The same is also valid for situations in which the sun is very high in the sky and/or the path of its rays through a glazing in a relatively vertical position is longer.

Preferably, the substrate according to the invention is a glass characterized by an infrared reflection $RIR_V$ such that $RIR_V \geq 1.087*TL_V+5$, more preferably such that $RIR_V \geq 1.087*TL_V+10$, and even more preferably such that $RIR_V \geq 1.087*TL_V+15$.

Alternatively, the substrate according to the invention is a glass characterized by an infrared reflection $RIR_V$ such that $RIR_V \geq 1.141*TL_V$, more preferably such that $RIR_V \geq 1.196*TL_V$, and even more preferably such that $RIR_V \geq 1.250*TL_V$.

Also alternatively, the substrate according to the invention is a glass characterized by an infrared reflection $RIR_V$ such that $RIR_V \geq 1.033*TL_V+5$ or such that $RIR_V \geq 1.033*TL_V+10$ or such that $RIR_V \geq 1.033*TL_V+15$, alternatively such that $RIR_V \geq 0.978*TL_V+10$ or such that $RIR_V \geq 0.978*TL_V+15$ or such that $RIR_V \geq 0.978*TL_V+20$, or also alternatively such that $RIR_V \geq 0.924*TL_V+15$ or such that $RIR_V \geq 0.924*TL_V+20$ or such that $RIR_V \geq 0.870*TL_V+20$.

Advantageously, the substrate according to the invention is a glass characterized by a light transmission $TL_V$ lower than 91%, 90%, 89%, 88%, 85%, 80%, 75%, 70% or 50%. Advantageously, the substrate according to the invention is a glass characterized by an infrared reflection $RIR_V$ higher than 50%, 75%, 80%, 85%, 90%, 95%, 97%, 98% or 99%. The choices of $TL_V$ and $RIR_V$ within the domain defined by the invention vary mainly depending on the color of the glass and are related to the appearance and to the energy properties desired for the final glazing.

According to one advantageous embodiment, the substrate according to the invention is a glass characterized by an infrared reflection $RIR_V$ such that $RIR_V \geq 0.510*TL_V+53$ or such that $RIR_V \geq 0.490*TL_V+55$, more preferably such that $RIR_V \geq 0.435*TL_V+60$ or such that $RIR_V \geq 0.380*TL_V+65$, and even more preferably such that $RIR_V \geq 0.326*TL_V+70$.

Preferably, a clear substrate according to the invention is a glass characterized by $TL_V>85\%$ and $RIR_V>98\%$, or by $TL_V>87\%$ and $RIR_V>98.5\%$, or even by $TL_V>88\%$ and $RIR_V>99\%$.

Preferably, a colored substrate according to the invention is a glass characterized by, from lightest to darkest, $TL_V<80\%$ and $RIR_V>87\%$, or by $TL_V<70\%$ and $RIR_V>80\%$, or by $TL_V<50\%$ and $RIR_V>60\%$, or even by $TL_V<30\%$ and $RIR_V>40\%$.

The substrate according to the invention is made of glass which may belong to various categories. The glass can thus be a glass of soda-lime-silica, aluminosilicate or borosilicate type, and the like. Preferably, the base composition of the glass comprises, in a content expressed in percentages by total weight of glass:

| | |
|---|---|
| $SiO_2$ | 55-85% |
| $Al_2O_3$ | 0-30% |
| $B_2O_3$ | 0-20% |
| $Na_2O$ | 0-25% |
| CaO | 0-20% |
| MgO | 0-15% |
| $K_2O$ | 0-20% |
| BaO | 0-20%. |

More preferably, the base composition of the glass comprises, in a content expressed in percentage by total weight of glass:

| | |
|---|---|
| $SiO_2$ | 55-78% |
| $Al_2O_3$ | 0-18% |
| $B_2O_3$ | 0-18% |
| $Na_2O$ | 0-20% |
| CaO | 0-15% |
| MgO | 0-10% |
| $K_2O$ | 0-10 |
| BaO | 0-5%. |

Most preferably and for reasons of lower production costs, the glass substrate according to the invention is made of soda-lime-silica glass. Advantageously, according to this embodiment, the base composition of the glass comprises, in a content expressed in percentage by total weight of glass:

| | |
|---|---|
| $SiO_2$ | 60-75% |
| $Al_2O_3$ | 0-6% |
| $B_2O_3$ | 0-4% |
| CaO | 0-15% |
| MgO | 0-10% |
| $Na_2O$ | 5-20% |
| $K_2O$ | 0-10% |
| BaO | 0-5%. |

In addition to its base composition, the glass may comprise other components, of nature and quantity tailored to the sought-after effect.

One solution proposed in the invention for obtaining a glass with a very high reflection in the infrared $RIR_V$ consists in using chromium in the composition of the glass, in a range of specific contents.

Thus, according to a first embodiment, the glass advantageously has a composition that comprises, in a content expressed in percentage by total weight of glass:

| | |
|---|---|
| Total iron (expressed in the form of $Fe_2O_3$) | 0.002-0.06%; |
| $Cr_2O_3$ | 0.0001-0.06%. |

Such glass compositions combining a low iron content and chromium have demonstrated a particularly good performance in terms of infrared reflection $RIR_V$ and exhibit a high transparency in the visible and a not very pronounced tint, close to a what is called "extra-clear" glass. These compositions are described in international patent applications WO2014128016A1, WO2014180679A1, WO2015011040A1, WO2015011041A1, WO2015011042A1, WO2015011043A1 and WO2015011044A1, which are incorporated by reference into the present patent application. According to this first particular embodiment, the composition preferably comprises a chromium content (expressed in the form of $Cr_2O_3$) ranging from 0.002% to 0.06% by weight with respect to the total weight of the glass. Such chromium contents allow the infrared reflection $RIR_V$ to be further improved.

According to a second embodiment, the glass has a composition that comprises, in a content expressed in percentage by total weight of glass:

| | |
|---|---|
| Total iron (expressed in the form of $Fe_2O_3$) | 0.002-0.06%; |
| $Cr_2O_3$ | 0.0015-1%; |
| Co | 0.0001-1%. |

Such glass compositions based on chromium and cobalt have demonstrated a particularly good performance in terms of infrared reflection $RIR_V$, while offering advantageous possibilities in terms of aesthetics/color (bluish neutrality to an intense hue or even up to opacity). Such compositions are described in European patent application no. 13 198 445.4, which is incorporated by reference into the present patent application.

According to a third embodiment, the glass has a composition that comprises, in a content expressed in percentage by total weight of glass:

| | |
|---|---|
| Total iron (expressed in the form of $Fe_2O_3$) | 0.02-1%; |
| $Cr_2O_3$ | 0.002-0.5%; |
| Co | 0.0001-0.5%. |

Preferably, according to this embodiment, the composition comprises: 0.06%<total iron≤1%.

Such compositions based on chromium and cobalt allow glass sheets to be obtained with colors in the blue-green range, which are comparable in terms of color and light transmission to commercially available blue and green glasses, but with a particularly good performance in terms of infrared reflection. Such compositions are described in European patent application EP15172780.7, which is incorporated by reference into the present patent application.

According to a fourth embodiment, the at least first external glass sheet has a composition that comprises, in a content expressed in percentage by total weight of glass:

| | |
|---|---|
| Total iron (expressed in the form of $Fe_2O_3$) | 0.002-1%; |
| $Cr_2O_3$ | 0.001-0.5%; |
| Co | 0.0001-0.5%; |
| Se | 0.0003-0.5%. |

Such glass compositions based on chromium, cobalt and selenium have demonstrated a particularly good performance in terms of infrared reflection, while offering advantageous possibilities in terms of aesthetics/color (gray neutrality to a slight to intense hue in the gray-bronze range). Such compositions are described in European patent application EP15172779.9, which is incorporated by reference into the present patent application.

Alternatively to chromium, other solutions using one or more components in specific contents to obtain a glass with a very high infrared reflection $RIR_V$ are also proposed according to the invention.

According to a first alternative embodiment, the glass has a composition that comprises, in a content expressed in percentage by total weight of glass:

| | |
|---|---|
| Total iron (expressed in the form of $Fe_2O_3$) | 0.002-0.06%; |
| $CeO_2$ | 0.001-1%. |

Such compositions are described in European patent application no. 13 193 345.9, which is incorporated by reference into the present patent application.

According to another alternative embodiment, the glass has a composition that comprises, in a content expressed in percentage by total weight of glass:

Total iron (expressed in the form of $Fe_2O_3$) 0.002-0.06%; and one of the following components:
  manganese (expressed in the form of MnO), in a content ranging from 0.01 to 1% by weight;
  antimony (expressed in the form of $Sb_2O_3$), in a content ranging from 0.01 to 1% by weight;
  arsenic (expressed in the form of $As_2O_3$), in a content ranging from 0.01 to 1% by weight;
  or
  copper (expressed in the form of CuO), in a content ranging from 0.0002 to 0.1% by weight.

Such compositions are described in European patent application no. 14 167 942.3, which is incorporated by reference into the present patent application.

According to yet another alternative embodiment, the glass has a composition that comprises, in a content expressed in percentage by total weight of glass:

Total iron (expressed in the form of $Fe_2O_3$) 0.002-0.04%;

and at least two components from chromium, selenium, copper, cerium, manganese and antimony; the chromium (expressed in the form of $Cr_2O_3$) being in a maximum content of 0.02% by weight; the selenium (expressed in the form of Se) being in a maximum content of 0.08% by weight; the copper (expressed in the form of CuO) being in a maximum content of 0.04% by weight; the cerium (expressed in the form of $CeO_2$) being in a maximum content of 0.8% by weight; the manganese (expressed in the form of MnO) being in a maximum content of 1.6% by weight; the antimony (expressed in the form of $Sb_2O_3$) being in a maximum content of 0.8% by weight; said composition respecting the formula:

$$A \leq [10.02*(Cr_2O_3/Fe_2O_3)+4*(Se/Fe_2O_3)+2.73*(CuO/Fe_2O_3)+0.7*(CeO_2/Fe_2O_3)+0.23*(MnO/Fe_2O_3)+0.11*(Sb_2O_3/Fe_2O_3)];$$

A being equal to 0.30.

Such compositions are described in European patent application no. 14 177 487.7, which is incorporated by reference into the present patent application.

According to the invention, the composition of the glass substrate has a redox of less than 15%. Preferably, the redox is less than 10%, or else less than 5% or even less than 3%. The degree of oxidation of a glass is given by its redox, here defined as the ratio by weight of $Fe^{2+}$ atoms to the total weight of iron atoms present in the glass, $Fe^{2+}$/total Fe. Equivalently, the redox may also be calculated by expressing the weight of ferrous iron ($Fe^{2+}$) and of total iron in $Fe_2O_3$ form. Alternatively, redox is sometimes expressed as the ratio by weight of ferrous iron ($Fe^{2+}$) expressed in FeO form to total iron expressed in $Fe_2O_3$ form. In this case, the following relationship makes it possible to pass from one expression to the other:

$$\frac{Fe^{2+} \text{ in Fe form}}{Fe_{Total} \text{ in Fe form}} = \frac{Fe^{2+} \text{ in } Fe_2O_3 \text{ form}}{Fe_{Total} \text{ in } Fe_2O_3 \text{ form}} = 1.1113 * \frac{Fe^{2+} \text{ in FeO form}}{Fe_{Total} \text{ in } Fe_2O_3 \text{ form}}$$

The infrared-reflecting layer according to the invention may preferably be characterized by a light transmission $TL_C$ such that $TL_C \geq 1.35*TIR_C$, $TL_C \geq 1.4*TIR_C$, or $TL_C \geq 1.5*TIR_C$, more preferably such that $TL_C \geq 1.75*TIR_C$, $TL_C \geq 1.9*TIR_C$, or $TL_C \geq 1.95*TIR_C$, and even more preferably $TL_C \geq 2*TIR_C$.

The layer may advantageously be characterized by an infrared reflection $RIR_C$ higher than $0.5*(1-AIR_C)$ or higher than $0.6*(1-AIR_C)$, or more preferably even higher than $0.76*(1-AIR_C)$ or higher than $0.86*(1-AIR_C)$ or higher than $0.9*(1-AIR_C)$ or higher than $0.95*(1-AIR_C)$ or higher than $0.96*(1-AIR_C)$ or higher than $0.97*(1-AIR_C)$ or higher than $0.98*(1-AIR_C)$ or higher than $0.99*(1-AIR_C)$.

In the range $RIR_C > 0.5*(1-AIR_C)$ and $RIR_C \leq 0.76*(1-AIR_C)$, the solar factor is not necessarily decreased in all circumstances with respect to the situation in which a substrate made of glass of the prior art of same $TL_V$ is used. However, this range remains useful in situations in which the temperature differences and/or air flow are favorable to a transfer of heat to the interior of the building or vehicle.

In the range $RIR_C > 0.76*(1-AIR_C)$, solar factor is decreased when a substrate made of glass of the prior art of same $TL_V$ is used, thus decreasing the amount of energy transmitted to the interior and increasing the selectivity of the glazing.

In these two ranges, other advantages according to the invention are present, such as the limitation of heating of the glazing, the varied esthetics and colors, the attenuated external light reflection, the correction of the color in external reflection, and/or the lesser angular dependence of the color in external reflection.

Alternatively, it may be advantageous to use in combination with the glass according to the invention, a layer having a $TIR_C$ lower than 50, 40, 35, 30, 25, 20, 15, 10, 5, 4, 3, 2 or 1%.

Advantageously the infrared-reflecting layer used for these applications is a multilayer stack comprising n functional layers based on an infrared-reflecting material, with n≥1, and n+1 dielectric coatings such that each functional layer is flanked by dielectric coatings.

The functional layers forming part of the infrared-reflecting layers are advantageously formed from noble metal. They may be based on silver, gold, palladium, platinum or a mixture or alloy thereof, but also based on copper or aluminum, alone, alloyed or in an alloy with one or more noble metals. Preferably, all the functional layers are silver-based. This is a noble metal that has a very high efficacy of reflection of infrared radiation. It is easily implemented in a magnetron device and its cost price is not prohibitive, especially with regard to its efficacy. Advantageously, the silver is doped with a few percent of palladium, aluminum or copper, for example in an amount of 1 to 10% by mass, or it is possible to use a silver alloy.

The transparent dielectric coatings forming part of the infrared-reflecting layers are well known in the field of layers deposited by cathode sputtering. There are many suitable materials and there is no reason to give a complete list thereof here. They are in general metal oxides, oxynitrides or nitrides. Among the most common, mention may be made by way of example of $SiO_2$, $TiO_2$, $SnO_2$, $ZnO$, $ZnAlOx$, $Si_3N_4$, $AlN$, $Al_2O_3$, $ZrO_2$, $Nb_2O_5$, $YO_x$, $TiZrYO_x$, $TiNbO_x$, $HfO_x$, $MgO_x$, $TaO_x$, $CrO_x$ and $Bi_2O_3$, and mixtures thereof. Mention may also be made of the following materials: AZO, ZTO, GZO, $NiCrO_x$, TXO, ZSO, TZO, TNO, TZSO, TZAO and TZAYO. The term AZO refers to a zinc oxide doped with aluminum or to a mixed zinc and aluminum oxide, preferably obtained from a ceramic target formed by the oxide to be deposited, sputtered either under a neutral or slightly oxidizing atmosphere. Likewise, the expressions ZTO or GZO respectively refer to mixed titanium and zinc or zinc and gallium oxides, obtained from ceramic targets, either under a neutral or slightly oxidizing atmosphere. The expression TXO refers to titanium oxide obtained from a ceramic titanium-oxide target. The expression ZSO refers to a mixed zinc-tin oxide obtained either from a metal target of the alloy deposited under oxidizing atmosphere or from a ceramic target of the corresponding oxide, under a neutral or slightly oxidizing atmosphere. The expressions TZO, TNO, TZSO, TZAO or TZAYO respectively refer to mixed titanium-zirconium, titanium-niobium, titanium-zirconium-tin, titanium-zirconium-aluminum or titanium-zirconium-aluminum-yttrium oxides obtained from ceramic targets, either under a neutral or slightly oxidizing atmosphere. All the aforementioned materials may be used to form the dielectric coatings used in the present invention.

Preferably, the dielectric coating placed under one or under each functional layer comprises, in direct contact with the one or more functional layers, a layer based on a zinc oxide, optionally doped for example with aluminum or gallium, or alloyed with tin oxide. Zinc oxide may have a particularly favorable effect on the stability and resistance to corrosion of the functional layer, in particular when it is based on silver. It is also favorable to the improvement of the electrical conductability of a silver-based layer, and therefore to the obtainment of a low emissivity.

The various layers of the stack are, for example, deposited by low-pressure magnetron cathode sputtering, in a well-known magnetron device. The present invention is however not limited to this particular layer-deposition process.

Laminated glazings according to the invention comprise at least one transparent substrate such as described above joined to a sheet of vitreous material by way of an adhesive plastic, generally PVB. They may be used as glazings in a building or in a motor vehicle. In the field of motor-vehicle glazings, they may be for example used by way of windshield but also for the other glazings of the vehicle such as side windows, roofs or windshields.

The laminated glazings according to the invention may be used as single glazings or be assembled into multiple glazings such as triple or double glazings in which the laminated glazing is associated with one or more other glass sheets, optionally provided with a coating, the laminated glazing being placed closest to the exterior of the multiple structure. The laminated glazing is thus positioned such that, when it is mounted on a building or a vehicle, the solar radiation first strikes the coated glass sheet on the side devoid of layer, then the infrared-reflecting layer, then the adhesive spacer sheet, then the second glass sheet, and then optionally another glass sheet if it is a question of a double glazing. The infrared-reflecting layer is therefore, according to the convention generally used, in position 2. It is in this position that the solar protection is most effective.

By way of example, particular embodiments of the invention will now be described, with reference to Examples 1 to 18 according to the invention and to Comparative Example C1-C24 not according to the invention.

The main properties of the glasses used in the examples and comparative examples are given in Table Ia. Their compositions, excluding $SiO_2$, are given in Table Ib in percentages by weight. Table II for its part describes infrared-reflecting layers according to the invention, respecting the relationship $TL_C \geq 1.3 * TIR_C$, whereas Table III gives an example (referred to as comparative) of a selective, infrared-reflecting layer, not respecting the relationship $TL_C \geq 1.3 * TIR_C$.

In Tables II and III,

ZSO5 represents a zinc-tin mixed oxide in which the proportion of zinc-tin is close to 50-50% by weight ($Zn_2Sn_2O_4$), SiN represents a silicon nitride, TZO represents a mixed titanium-zirconium oxide, in which the titanium oxide and zirconium oxide proportion is close to 65-35% by weight.

TABLE Ia

| Type of glass | $RIR_{V\,(ISO9050)}$ | $TL_{V\,(C,\,2)}$ | a* (D, 10) | b* (D, 10) |
|---|---|---|---|---|
| comp-clear | 76.8 | 89.7 | −0.9 | 0.2 |
| comp-extraclear | 95.4 | 91.5 | −0.1 | 0.1 |
| inv-clear | 99.2 | 89.9 | −0.9 | 0.6 |
| comp-green | 17.7 | 78.5 | −6.1 | 1.2 |
| inv-green | 97.1 | 75.5 | −5.4 | 0.4 |
| comp-dark green | 11 | 72.7 | −8.3 | 2 |
| inv-dark green | 96.8 | 71.1 | −7.3 | 1.4 |
| comp-green 'privacy' | 5 | 34.3 | −16.6 | 0.4 |
| inv-green 'privacy' | 91 | 41 | −16.1 | −1.1 |
| inv-blue | 96 | 77.2 | −3 | −2.9 |
| comp-dark blue | 18.4 | 66.7 | −6.6 | −8.1 |
| inv-dark blue | 95.1 | 64.2 | −5.4 | −8.3 |
| comp-blue 'privacy' | 6.7 | 46.5 | −12.7 | −11.8 |
| inv-blue 'privacy' | 90.4 | 42 | −10.6 | −12.2 |
| comp-light gray | 35.7 | 70.1 | −1.1 | 0 |
| inv-light gray | 97.1 | 70.1 | 0 | 0 |
| comp-gray | 42.7 | 55.7 | 0.9 | −2.1 |
| inv-gray | 95.2 | 55.9 | −1.4 | −1.9 |
| comp-gray 'privacy' | 7.7 | 17.4 | −1 | −0.1 |
| inv-gray 'privacy' | 87.3 | 17.3 | 1.2 | −0.9 |
| comp-bronze | 45.9 | 61 | 2.8 | 4.4 |
| inv-bronze | 96.6 | 58 | 2.6 | 4.3 |

TABLE Ib

| Type of glass | CaO (%) | K2O (%) | Na2O (%) | Fe2O3 (%) | SO3 (%) | TiO2 (%) | Al2O3 (%) | MgO (%) | ZrO2 (ppm) | MnO (ppm) | BaO (ppm) | Co (ppm) | Se (ppm) | Cr2O3 (ppm) | V2O5 (ppm) | Ni (ppm) |
|---|---|---|---|---|---|---|---|---|---|---|---|---|---|---|---|---|
| comp-clear | 8.700 | 0.130 | 13.830 | 0.085 | 0.260 | 0.045 | 0.880 | 4.320 | 40 | 200 | 40 | | | | | |
| comp-extraclear | 9.090 | 0.024 | 13.930 | 0.011 | 0.230 | 0.017 | 0.721 | 4.320 | 28 | | | 0.25 | | | | |
| inv-clear | 7.910 | 0.018 | 13.830 | 0.009 | 0.341 | <0.016 | 1.338 | 4.460 | 45 | | | 4.000 | | 46 | | |
| comp-green | 8.990 | 0.148 | 13.650 | 0.595 | 0.186 | 0.049 | 0.803 | 4.080 | 74 | 201 | 38 | | | | | |
| inv-green | 8.000 | 0.200 | 13.500 | 0.060 | 0.300 | | 1.000 | 4.500 | | | | 29 | | 330 | | |
| comp-dark green | 8.400 | 0.143 | 13.880 | 0.832 | 0.153 | 0.048 | 0.931 | 4.150 | 49 | 191 | 46 | | | | | 14 |
| inv-dark green | 8.000 | 0.200 | 13.500 | 0.069 | 0.300 | | 1.000 | 4.500 | | | | 36 | | 470 | | |
| comp-green 'privacy' | 8.330 | 0.157 | 13.700 | 1.552 | 0.136 | 0.048 | 0.928 | 4.020 | 53 | 202 | 49 | 79 | | 214 | 425 | |
| inv-green 'privacy' | 8.000 | 0.200 | 13.500 | 0.069 | 0.300 | | 1.000 | 4.500 | | | | 128 | | 1370 | | |
| inv-blue | 8.000 | 0.200 | 13.500 | 0.0086 | 0.352 | | 1.000 | 4.500 | | | | 41 | | 65 | | |
| comp-dark blue | 8.490 | 0.109 | 13.700 | 0.481 | 0.093 | 0.050 | 0.868 | 4.190 | 47 | 224 | 49 | 44 | <3 | 24 | | |
| inv-dark blue | 8.000 | 0.200 | 13.500 | 0.042 | 0.300 | | 1.000 | 4.500 | | | | 73 | | 287.7 | | |
| comp-blue 'privacy' | 8.460 | 0.134 | 13.820 | 0.822 | 0.070 | 0.052 | 0.951 | 4.170 | 48 | 230 | 55 | 90 | | 205 | | |
| inv-blue 'privacy' | 8.000 | 0.200 | 13.500 | 0.042 | 0.300 | | 1.000 | 4.500 | | | | 152 | | 840 | | |
| comp-light gray | 8.910 | 0.072 | 13.930 | 0.330 | 0.164 | 0.011 | 0.126 | 3.700 | 31 | 39 | <21 | 23 | 7 | <6 | | |
| inv-light gray | 8.000 | 0.200 | 13.500 | 0.075 | 0.300 | | 1.000 | 4.500 | | | | 36 | 74 | 111 | | |
| comp-gray | 8.800 | 0.219 | 13.770 | 0.346 | 0.308 | 0.031 | 0.865 | 4.180 | 44 | 120 | | 64 | 20 | | | 17 |
| inv-gray | 8.000 | 0.200 | 13.500 | 0.043 | 0.300 | | 1.000 | 4.500 | | | | 69.9 | 200 | 287.8 | | |

TABLE Ib-continued

| Type of glass | CaO (%) | K2O (%) | Na2O (%) | Fe2O3 (%) | SO3 (%) | TiO2 (%) | Al2O3 (%) | MgO (%) | ZrO2 (ppm) | MnO (ppm) | BaO (ppm) | Co (ppm) | Se (ppm) | Cr2O3 (ppm) | V2O5 (ppm) | Ni (ppm) |
|---|---|---|---|---|---|---|---|---|---|---|---|---|---|---|---|---|
| comp-gray 'privacy' | 8.520 | 0.232 | 13.700 | 0.371 | 0.153 | 0.047 | 1.008 | 4.180 | 50 | 191 | 56 | 15 | | | | |
| inv-gray 'privacy' | 8.000 | 0.200 | 13.500 | 0.067 | | 0.300 | 1.000 | 4.500 | | | | 215 | 560 | 800 | | |
| comp-bronze | 8.880 | 0.122 | 13.540 | 0.313 | | 0.250 | 0.670 | 4.240 | 41 | 216 | 52 | 30 | 27 | 33 | | |
| inv-bronze | 8.000 | 0.200 | 13.500 | 0.040 | | 0.300 | 1.000 | 4.500 | | | | 44.9 | 340.8 | 200 | | |

TABLE II

| A | RIRc > 0.86* (1-AIRc) | | | ZSO5 385 Å | ZnO 142 Å | Ag 55 Å | Ti | ZSO5 745 Å | ZnO 146 Å | Ag 60 Å | Ti | ZSO5 710 Å | ZnO 133 Å | Ag 50 Å | Ti | ZSO5 290 Å | Ti 50 Å |
|---|---|---|---|---|---|---|---|---|---|---|---|---|---|---|---|---|---|
| B | $TL_C$ 79.6 | $TIR_C$ 17.2 | $RIR_C$ 74.2 | $AIR_C$ 8.6 | ZSO5 290 Å | ZnO 120 Å | Ag 60 Å | Ti | ZSO5 950 Å | ZnO 94 Å | Ag 53 Å | Ti | ZSO5 180 Å | Ti 50 Å | | | |
| C | $TL_C$ 25.7 | $TIR_C$ 9.9 | $RIR_C$ 61.1 | $AIR_C$ 29 | SiN 588 Å | NiCr 36 Å | Ag 165 Å | NiCr 67 Å | SiN 500 Å | | | | | | | | |
| D | $TL_C$ 88.8 | $TIR_C$ 37.2 | $RIR_C$ 57 | $AIR_C$ 5.8 | TiO2 180 Å | ZnO 118 Å | Ag 30 Å | TiO2 445 Å | ZnO | TZO | | | | | | | |

TABLE III

| Z | $TL_C$ | $TIR_C$ | $RIR_C$ | $AIR_C$ | SnO2 | TZO |
|---|---|---|---|---|---|---|
| | 68.7 | 82.5 | 17.5 | 0 | 150 Å | 420 Å |

In the following tables, unless otherwise indicated, the measurements are given for laminated glazings comprising from the exterior a coated first glass-substrate (layer in position 2) of 6 mm thickness (except for the Comparative Examples C1, C2, C3, where the thickness is 8 mm), a PVB film of 0.76 mm thickness, and a second glass, called 'mid-iron' glass, of 4 mm thickness. The properties in terms of light transmission (TL), light reflection (RL), solar factor (SF), selectivity (select=TL/SF), absorption (Abs), unless otherwise indicated, are given according to standard ISO9050:2003, under illuminant D, 2°. The L*, a*, b* colors are given according to the CIE Lab model defined in 1976 by the Commission internationale de l'éclairage (CIE), under illuminant D, 10°, in transmission (T) and in reflection (R). The absorption (Abs) is the energy absorption of the complete laminated glazing.

TABLE A

| ex. | Substrate | Layer | TL D2* | L* D10 T | a* D10 T | b* D10 T | RL D2* | L* D10 R | a* D10 R | b* D10 R | Abs | SF | Select TL/SF |
|---|---|---|---|---|---|---|---|---|---|---|---|---|---|
| 1 | inv-light gray | A | 48.2 | 74.8 | −0.5 | 2.9 | 7.4 | 32.6 | −2.1 | −0.3 | 70.2 | 30.4 | 1.6 |
| C1 | comp-light gray | A | 49 | 75.3 | −4.4 | 4.3 | 7.5 | 32.9 | −4.3 | 0.6 | 72.8 | 38.3 | 1.3 |
| 2 | inv-light gray | B | 52.9 | 77.6 | 0.2 | 2.4 | 7.3 | 32.5 | −3.2 | −1.5 | 58.8 | 41.6 | 1.3 |
| C2 | comp-light gray | B | 53.7 | 78.1 | −3.9 | 3.9 | 7.4 | 32.8 | −5.1 | −0.7 | 68.6 | 41.7 | 1.3 |
| 3 | inv-light gray | C | 16.6 | 47.6 | −2.1 | 3.9 | 19.1 | 50.8 | 0.9 | −5.4 | 68.8 | 24.8 | 1.3 |
| C3 | comp-light gray | C | 16.8 | 47.9 | −5 | 4.9 | 19.0 | 51.4 | −3.8 | −3.5 | 72.7 | 28.2 | 0.6 |
| 4 | inv-green | A | 53.8 | 78.2 | −7.4 | 3.4 | 8.3 | 34.5 | −5.5 | 0.3 | 68 | 31.5 | 1.7 |
| C4 | comp-green | A | 57.1 | 80.2 | −8.1 | 4.3 | 8.7 | 35.3 | −7.3 | 1.5 | 68.4 | 40.4 | 1.4 |
| 5 | inv-green | B | 59 | 81.2 | −6.8 | 2.9 | 8.1 | 34.3 | −6.8 | −1.1 | 56.8 | 42.5 | 1.4 |
| C5 | comp-green | B | 62.5 | 83.2 | −7.7 | 3.9 | 8.6 | 35.3 | −8.2 | −0.8 | 63.4 | 44.5 | 1.4 |
| 6 | inv-green | C | 18.5 | 56 | −7.1 | 4.4 | 22.9 | 55.1 | −7.1 | −5.1 | 64.7 | 25.0 | 0.7 |
| C6 | comp-green | C | 19.7 | 51.4 | −7.8 | 5 | 25.2 | 57.5 | −9.2 | −3.8 | 65.8 | 28.5 | 0.7 |
| 7 | inv-green | D | 60.3 | 82 | −9.3 | 0.2 | 9.2 | 36.2 | −0.9 | 4.9 | 45.6 | 51.5 | 1.2 |
| C7 | comp-green | D | 63.9 | 84 | −10.5 | 1.2 | 9.8 | 37.3 | −1.2 | 5.6 | 55..2 | 46.6 | 1.4 |
| 8 | inv-green 'privacy' | A | 22.5 | 54.3 | −18.5 | 1.5 | 5.1 | 27 | −2.2 | −0.7 | 84.9 | 23.1 | 1.0 |
| C8 | comp-green 'privacy' | A | 17.2 | 48.6 | −18.6 | 2.5 | 4.7 | 25.9 | −2.1 | 0 | 89 | 29.3 | 0.6 |
| 9 | inv-green 'privacy' | B | 24.6 | 56.5 | −18.4 | 1 | 5 | 26.8 | −2.9 | −0.4 | 70.4 | 31.4 | 0.8 |
| C9 | comp-green 'privacy' | B | 18.8 | 50.6 | −18.8 | 2.2 | 4.7 | 25.9 | −2.2 | −0.4 | 88.1 | 30.0 | 0.6 |
| 10 | inv-green 'privacy' | C | 7.7 | 33.3 | −14.3 | 2.7 | 7.8 | 33.6 | −7.4 | −2.7 | 85 | 23.8 | 0.3 |
| C10 | comp-green 'privacy' | C | 5.9 | 29.2 | −14.4 | 3 | 0.3 | 30.3 | −6.9 | 1 | 91.5 | 26.2 | 0.2 |
| 11 | inv-dark blue | A | 42.5 | 71.4 | −7.1 | −7.7 | 6.8 | 31.5 | −2.7 | −4.8 | 72.9 | 29.3 | 1.5 |
| C11 | comp-dark blue | A | 44.9 | 73.2 | −8.6 | −7.5 | 7.1 | 32.1 | −4.4 | −4.3 | 73.5 | 37.8 | 1.2 |
| 12 | inv-dark blue | B | 46.6 | 74.2 | −6.6 | −8.5 | 6.8 | 31.5 | −4.3 | −5.6 | 62 | 39.9 | 1.2 |
| C12 | comp-dark blue | B | 49.2 | 75.9 | −8.2 | −8.3 | 7 | 32.2 | −5.6 | −5.9 | 68.7 | 41.8 | 1.2 |
| 13 | inv-dark blue | C | 14.6 | 45.2 | −6.9 | −3.4 | 16.3 | 47.6 | −3.5 | −17.3 | 72.7 | 24.7 | 0.6 |
| C13 | comp-dark blue | C | 15.4 | 46.4 | −8.1 | −3.4 | 17.5 | 49.6 | −6.1 | −17.4 | 74.7 | 28.2 | 0.5 |
| 14 | inv-dark blue | D | 47.7 | 75 | −8.6 | −11.2 | 7.3 | 32.6 | −1.1 | −1.1 | 51.6 | 48.9 | 1.6 |
| C14 | comp-dark blue | D | 50.5 | 76.8 | −10.4 | −11.1 | 7.7 | 33.3 | −1.9 | −1.1 | 65 | 44.0 | 1.1 |
| 15 | inv-gray 'privacy' | A | 6.3 | 29.8 | 0.4 | 1 | 4.3 | 24.7 | −0.6 | −0.5 | 91.1 | 19.6 | 0.3 |
| C15 | comp-gray 'privacy' | A | 6.3 | 30 | −1.5 | 1.5 | 4.3 | 28.7 | −0.1 | −0.5 | 92.8 | 26.8 | 0.2 |
| 16 | inv-gray 'privacy' | B | 6.9 | 31.2 | 1 | 0.5 | 4.3 | 24.7 | 0 | −0.5 | 83.1 | 27.4 | 0.3 |
| C16 | comp-gray 'privacy' | B | 6.9 | 31.4 | −1.1 | 1.3 | 4.3 | 24.7 | −0.1 | −0.5 | 91.5 | 27.7 | 0.2 |
| 17 | inv-gray 'privacy' | C | 2.2 | 16 | −0.5 | 1.8 | 4.5 | 25.4 | 0.3 | −0.9 | 90.2 | 23.0 | 0.1 |
| C17 | comp-gray 'privacy' | C | 2.2 | 16.2 | −1.9 | 2.1 | 4.5 | 25.3 | −0.1 | −0.7 | 94.1 | 25.6 | 0.1 |

TABLE A-continued

| ex. | Substrate | Layer | TL D2* | L* D10 T | a* D10 T | b* D10 T | RL D2* | L* D10 R | a* D10 R | b* D10 R | Abs | SF | Select TL/SF |
|---|---|---|---|---|---|---|---|---|---|---|---|---|---|
| 18 | inv-gray 'privacy' | D | 7 | 31.6 | 0.3 | −0.9 | 4.3 | 24.8 | 0.1 | −0.4 | 74.6 | 35.2 | 0.2 |
| C18 | comp-gray 'privacy' | D | 7.1 | 31.8 | −2.1 | −0.2 | 4.3 | 24.8 | 0 | −0.4 | 90.7 | 28.3 | 0.3 |

TABLE B

| ex. | Substrate | Layer | TL D2* | L* D10 T | a* D10 T | b* D10 T | LR D2* | L* D10 R | a* D10 R | b* D10 R | Abs | SF | Select TL/SF |
|---|---|---|---|---|---|---|---|---|---|---|---|---|---|
| C19 | inv-green | Z | 58.9 | 81.1 | −7 | 3.5 | 14.2 | 44.7 | −6.9 | −2.9 | 20.9 | 70.5 | 0.8 |
| C20 | comp-green | Z | 62.5 | 83.1 | −7.9 | 4.6 | 15.4 | 46.4 | −8.5 | −2 | 48.8 | 50.0 | 1.3 |
| C21 | inv-dark blue | Z | 46.5 | 74.1 | −6.8 | −7.9 | 10.6 | 39.3 | −3.9 | −11.6 | 28.9 | 67.6 | 0.7 |
| C22 | comp-dark blue | Z | 49.1 | 75.9 | −6.4 | −7.7 | 11.4 | 46.7 | −5.8 | −11.8 | 56.4 | 47.6 | 1.0 |
| C23 | inv-gray 'privacy' | Z | 6.9 | 31.2 | −1.2 | 0.9 | 4.4 | 25 | 0.1 | −0.7 | 56.1 | 53.0 | 0.1 |
| C24 | comp-gray 'privacy' | Z | 6.9 | 31.4 | −1.1 | 1.6 | 4.4 | 25 | −0.1 | −0.6 | 88.8 | 29.7 | 0.2 |

EXAMPLES 1 TO 18 AND COMPARATIVE EXAMPLES C1 TO C18

Various layers according to the invention have been combined with different glasses, certain of which, not according to the invention (referenced comp-), have an infrared reflection $RIR_V$ lower than 1.087 times their light transmission $TL_V$, and others, according to the invention (referenced inv-), have an infrared reflection $RIR_V$ higher than or equal to 1.087 times their light transmission $TL_V$. Simulated values of the light transmission and reflection, colors in transmission and in reflection, solar factor, selectivity and total absorption of the laminated glazings are given in Table A.

These results show that the combined use of a glass having an infrared reflection such that $RIR_V \geq 1.087^*TL_V$ and of a layer respecting the relationship $TL_C \geq 1.3^*TIR_C$ leads, at equivalent TL, to a decrease in solar factor, or at the very least a solar factor that is similar or little increased, at the same time as a lesser absorption. These combinations may therefore advantageously be used for solar-control or anti-solar glazings.

The examples including the layers A, B, or C, show that the combined use of a glass having an infrared reflection such that $RIR_V \geq 1.087^*TL_V$ and of a layer respecting the relationship $TL_C \geq 0.76^*TIR_C$ leads, at equivalent TL, to a decrease in solar factor at the same time as a lesser absorption, in all circumstances.

The examples including the layer D furthermore show that the combined use of a glass having an infrared reflection such that $RIR_V \geq 1.087^*TL_V$ and of a layer characterized by an infrared reflection $RIR_C$ in the range $RIR_C > 0.5^*(1-AIR_C)$ and $RIR_C \leq 0.76^*(1-AIR_C)$ leads, at equivalent TL, to only a small increase in the solar factor (of about at most 5%), which is acceptable in certain circumstances, but again with the benefit of a lesser absorption.

COMPARATIVE EXAMPLES C19 TO C24

A layer not according to the invention was combined with various glasses, certain of which were not according to the invention (referenced comp-) and others of which were according to the invention (referenced inv-). Simulated values of the light transmission and reflection, colors in transmission and in reflection, solar factor, selectivity and absorption of the laminated glazing are given in Table B.

These comparative examples show that the combined use of a glass having an infrared reflection such that $RIR_V \geq 1.087^*TL_V$ and of a layer not respecting the relationship $TL_C \geq 1.3^*TIR_C$ leads, at equivalent TL, to a clear increase in the solar factor (of about 20%) and to a clearly decreased selectivity, this making such glazings unsuitable for solar-control applications.

The invention claimed is:

1. A laminated glazing comprising a transparent substrate coated with an infrared-reflecting layer, wherein:
   the substrate is a glass the composition of which has a redox lower than 15%, and the glass has an infrared reflection $RIR_V$ between 780 and 2500 nm such that $RIR_V \geq 1.087^*TL_V$, $TL_V$ being the light transmission of the glass between 380 and 780 nm, and
   the infrared-reflecting layer has a light transmission $TL_C$ between 380 and 780 nm such that $TL_C \geq 1.3^*TIR_C$, $TIR_C$ being the infrared transmission of the layer between 780 and 2500 nm.

2. The laminated glazing of claim 1, wherein the substrate is a glass having an infrared reflection $RIR_V$ such that $RIR_V \geq 1.087^*TL_V + 5$.

3. The laminated glazing of claim 1, wherein the substrate is a glass having an infrared reflection $RIR_V$ such that $RIF_V \geq 0.510^*TL_V + 53$.

4. The laminated glazing of claim 1, wherein the glass of the substrate has a composition that comprises, in a content expressed in percentage by total weight of glass:
   total iron, expressed in the form of $Fe_2O_3$: 0.002-0.06%; and
   $Cr_2O_3$: 0.0001-0.06%.

5. The laminated glazing of claim 1, wherein the glass of the substrate has a composition that comprises, in a content expressed in percentages by total weight of glass:
   total iron, expressed in the form of $Fe_2O_3$: 0.002-0.06%;
   $Cr_2O$: 0.0015-1%; and
   Co: 0.0001-1%.

6. The laminated glazing of claim 1, wherein the glass of the substrate has a composition that comprises, in a content expressed in percentages by total weight of glass:
   total iron, expressed in the form of $Fe_2O_3$: 0.02-1%;
   $Cr_2O_3$: 0.002-0.5%; and
   Co: 0.0001-0.5%.

7. The laminated glazing of claim 1, wherein the glass of the substrate has a composition that comprises, in percentages by total weight of glass:

total iron, expressed in the form of $Fe_2O_3$: 0.002-1%;
$Cr_2O_3$: 0:0010-0.5%;
Co: 0.0001-0.5%; and
Se: 0.0003-0.5%.

8. The laminated glazing of claim 1, wherein the infrared-reflecting layer has an infrared reflection $RIR_C$ higher than to $0.5*(1-AIR_C)$.

9. The laminated glazing of claim 1, wherein the infrared-reflecting layer has an infrared reflection $RIR_C$ higher than $0.76*(1-AIR_C)$.

10. The laminated glazing of claim 1, wherein the infrared-reflecting layer is a multilayer stack comprising n functional layers based on an infrared-reflecting material, with $n \geq 1$, and n+1 dielectric coatings such that each functional layer is flanked by dielectric coatings.

11. The laminated glazing of claim 10, wherein the one or more functional layers of the infrared-reflecting layer are silver-based.

* * * * *

UNITED STATES PATENT AND TRADEMARK OFFICE
CERTIFICATE OF CORRECTION

PATENT NO. : 10,391,744 B2
APPLICATION NO. : 15/737563
DATED : August 27, 2019
INVENTOR(S) : Lambricht et al.

Page 1 of 1

It is certified that error appears in the above-identified patent and that said Letters Patent is hereby corrected as shown below:

On the Title Page

Item (73), the Assignee's city is incorrect. Item (73) should read:
-- (73) Assignee: AGC GLASS EUROPE, Louvain-la-Neuve (BE) --

Signed and Sealed this
Fourteenth Day of April, 2020

Andrei Iancu
*Director of the United States Patent and Trademark Office*